US012590019B2

(12) United States Patent
Wang et al.

(10) Patent No.: US 12,590,019 B2
(45) Date of Patent: Mar. 31, 2026

(54) STRAIGHT-LINE SEWAGE TREATMENT SYSTEM FOR ENHANCED TREATMENT OF LOW C/N DOMESTIC SEWAGE

(71) Applicant: TONGJI UNIVERSITY, Shanghai (CN)

(72) Inventors: Lin Wang, Shanghai (CN); Qiya Sun, Shanghai (CN); Yongmei Li, Shanghai (CN); Qian Pin, Shanghai (CN); Manhong Huang, Shanghai (CN); Qinyuan Lu, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 765 days.

(21) Appl. No.: 17/976,937

(22) Filed: Oct. 31, 2022

(65) Prior Publication Data

US 2024/0092664 A1    Mar. 21, 2024

(30) Foreign Application Priority Data

Sep. 16, 2022    (CN) .......................... 202211133182.0

(51) Int. Cl.
*C02F 3/28*        (2023.01)
*C02F 1/00*        (2023.01)
(Continued)

(52) U.S. Cl.
CPC .............. *C02F 3/2886* (2013.01); *C02F 1/72* (2013.01); *C02F 3/101* (2013.01); *C02F 3/107* (2013.01); *C02F 3/108* (2013.01); *C02F 3/1215* (2013.01); *C02F 3/308* (2013.01); *C02F 2001/007* (2013.01); *C02F 2101/105* (2013.01); *C02F 2101/16* (2013.01); *C02F 2101/38* (2013.01); *C02F 2103/005* (2013.01);
(Continued)

(58) Field of Classification Search
CPC .......... C02F 3/2886; C02F 1/72; C02F 3/101; C02F 3/107; C02F 3/108; C02F 3/1215; C02F 3/308; C02F 2001/007; C02F 2101/105; C02F 2101/16; C02F 2101/38; C02F 2103/005; C02F 2201/007; C02F 2203/006; C02F 2301/046; C02F 2303/04; C02F 1/722; C02F 3/305; C02F 2101/301; C02F 9/00; C02F 2201/004; C02F 2305/06; C02F 1/50; C02F 2209/08; C02F 2209/14; C02F 2209/16; C02F 2303/14; Y02W 10/10
USPC ....................................... 210/195.3
See application file for complete search history.

(56)        References Cited

U.S. PATENT DOCUMENTS

2010/0155328 A1* 6/2010 O'Regan, Jr. ............. C02F 9/00
                                                210/96.1
2021/0188681 A1* 6/2021 Boucher ................... C02F 3/00
2022/0017393 A1* 1/2022 Li ........................... C02F 3/109

FOREIGN PATENT DOCUMENTS

CN        109250818 A  *  1/2019   ............... C02F 3/28
CN        112429840 A  *  3/2021   ........... C02F 3/2806
CN        114853172 A      8/2022

* cited by examiner

*Primary Examiner* — Ekandra S. Miller-Cruz
(74) *Attorney, Agent, or Firm* — Ming Jiang; OPENPTO US LLC

(57)        ABSTRACT

The present invention discloses a straight-line sewage treatment system for enhanced treatment of low-carbon-to-nitrogen ratio (C/N) domestic sewage, including a sewage intake tank, an enhanced denitrification tank through a pipeline, an effluent outlet of the enhanced denitrification tank, an effluent pipe, a first storage tank, a second storage tank, and a disinfection tank.

8 Claims, 4 Drawing Sheets

(51) Int. Cl.

| | | |
|---|---|---|
| *C02F 1/72* | (2023.01) | |
| *C02F 3/10* | (2023.01) | |
| *C02F 3/12* | (2023.01) | |
| *C02F 3/30* | (2023.01) | |
| *C02F 101/10* | (2006.01) | |
| *C02F 101/16* | (2006.01) | |
| *C02F 101/38* | (2006.01) | |
| *C02F 103/00* | (2006.01) | |

(52) U.S. Cl.

CPC .. *C02F 2201/007* (2013.01); *C02F 2203/006* (2013.01); *C02F 2301/046* (2013.01); *C02F 2303/04* (2013.01)

STRAIGHT-LINE SEWAGE TREATMENT SYSTEM FOR ENHANCED TREATMENT OF LOW C/N DOMESTIC SEWAGE

CROSS-REFERENCE TO RELATED PATENT APPLICATION

This non-provisional application claims priority to and the benefit of, pursuant to 35 U.S.C. § 119(a), patent application Serial No. CN 202211133182.0 filed in China on Sep. 16, 2022. The disclosure of the above application is incorporated herein in its entirety by reference.

TECHNICAL FIELD

The present invention relates to the field of sewage treatment technologies and application thereof, and specifically to a straight-line sewage treatment system for enhanced treatment of low-carbon-to-nitrogen ratio (C/N) domestic sewage.

BACKGROUND

In recent years, with the continuous development of society and the continuous improvement of the economic level, the discharge of domestic sewage has increased significantly. However, the rural domestic sewage treatment rate is still low. The sewage produced by villages and towns is often discharged directly through ditches to the surrounding ground, farmland and river courses, causing serious pollution.

At present, similar to urban domestic sewage, rural domestic sewage is mostly treated using technologies such as an anoxic/aerobic (A/O) process and an anaerobic/anoxic/oxic ($A^2O$) process. However, such processes generally require the carbon to nitrogen (C/N) ratio to be greater than 6.00 in order to ensure complete denitrogenation. In fact, the C/N ratio of rural domestic sewage is generally less than 4, which affects the total nitrogen (TN) removal rate of sewage treatment facilities to some extent. In addition, such processes generally require high infrastructure investment and operation costs, high energy consumption, and complex management and maintenance, and are not suitable for rural domestic sewage treatment. Therefore, it is important to explore an efficient, easy-to-operate treatment process of low C/N sewage for achieving effective reduction of nitrogen and phosphorus in domestic wastewater and improving the rural living environment.

Up to now, numerous studies have been carried out to explore treatment processes for low C/N domestic sewage, and the efficient treatment of low C/N domestic sewage has been achieved, for example, as described in the literature CN114853172A. However, in practical application scenarios, such processes often involve complex operations and high energy consumption, and cannot adapt to the special geographical location and limited economic level of rural areas and the lack of technical talents in rural areas. Moreover, such processes fail to provide special treatment for the large amounts of chemicals such as detergents, bacterial viruses, and parasite eggs in rural domestic sewage, which may still be present in treated sewage. Therefore, it is important to explore a straight-line sewage treatment process with efficient treatment of low C/N domestic sewage for improving the sewage effluent quality, achieving the resourceful utilization of sewage and improving the quality of the water environment.

SUMMARY

The present invention provides a cost-effective, easy-to-operate straight-line sewage treatment system for enhanced treatment of low C/N domestic sewage with a good pollutant removal effect, which has a broad application prospect in the treatment of rural sewage.

To solve the above problems, the following technical solutions are employed in the present invention.

A straight-line sewage treatment system for enhanced treatment of low C/N domestic sewage is provided, including a sewage intake tank, wherein the sewage intake tank is in communication with an enhanced denitrification tank through a pipeline, an effluent outlet of the enhanced denitrification tank is in communication with an effluent pipe, a first storage tank is arranged below the effluent pipe, the effluent from the enhanced denitrification tank flows into the first storage tank through the effluent pipe, the first storage tank is in communication with an enhanced phosphorus removal tank through a pipeline, the enhanced phosphorus removal tank is in communication with a second storage tank through a pipeline, and the second storage tank is in communication with a disinfection tank and the sewage intake tank through pipelines respectively.

The effluent pipe based on the theory of communicating vessels is arranged at the bottom of the enhanced denitrification tank to create an anaerobic environment for enhanced denitrification.

Preferably, in the straight-line sewage treatment system for enhanced treatment of low C/N domestic sewage, a lifting pump is arranged on the pipeline through which the sewage intake tank is in communication with the enhanced denitrification tank.

Preferably, in the straight-line sewage treatment system for enhanced treatment of low C/N domestic sewage, the straight-line sewage treatment system further includes a support, the enhanced denitrification tank is arranged on the support, and the enhanced phosphorus removal tank is arranged below the support.

Preferably, in the straight-line sewage treatment system for enhanced treatment of low C/N domestic sewage, a rotary sealing cover is arranged at the top of the enhanced denitrification tank, a high molecular polymer introduction layer and a first water collecting layer are arranged in sequence from top to bottom in the enhanced denitrification tank, and the high molecular polymer introduction layer is filled with a high molecular polycaprolactone polymer. The rotary sealing cover allows for the regular replacement of the high molecular polymer.

Preferably, in the straight-line sewage treatment system for enhanced treatment of low C/N domestic sewage, a filler layer and a second water collecting layer are arranged in sequence from top to bottom in the enhanced phosphorus removal tank, and the first water collecting layer and the second water collecting layer are filled with gravels.

Preferably, in the straight-line sewage treatment system for enhanced treatment of low C/N domestic sewage, the filler layer is filled with a mixture of natural river sand having a particle size of 1-1.5 mm, biological ceramic grains having a particle size of 2-3 mm, and manganese sand having a particle size of 1-2 at a ratio of 7:2:1.

Preferably, in the straight-line sewage treatment system for enhanced treatment of low C/N domestic sewage, the second storage tank is provided with an effluent outlet in communication with the sewage intake tank through a pipeline and a discharge outlet in communication with the disinfection tank through a pipeline.

Preferably, in the straight-line sewage treatment system for enhanced treatment of low C/N domestic sewage, a reflux pump is arranged on the pipeline through which the second storage tank is in communication with the sewage intake tank, to achieve the partial reflux of the effluent from the enhanced phosphorus removal tank.

Preferably, in the straight-line sewage treatment system for enhanced treatment of low C/N domestic sewage, a stirrer is arranged in the disinfection tank, to achieve uniform mixing of a disinfectant. The disinfection tank is disinfected with peroxyacetic acid, and the concentration of peroxyacetic acid introduced is 5-10 mg/L.

Compared with the prior art, the present invention has the following beneficial effects.

(1) The straight-line sewage treatment system for enhanced treatment of low C/N domestic sewage provided in the present invention has a multi-stage functional structure, a skillful filler combination, and an appropriate filler ratio, providing the system with an excellent pollutant treatment effect, especially in nitrogen and phosphorus treatment. The enhanced denitrification tank provides a suitable anaerobic environment for microorganisms having the denitrification function, and polycaprolactone is added to provide the organic matters required for the denitrification reaction to solve the problem of insufficient carbon source in the denitrification process, thereby achieving the efficient removal of nitrogen. In addition, the manganese sand filler is added in the enhanced phosphorus removal tank, and based on the co-degradation effect of manganese sand and microorganisms on organic matters, high-valence manganese ions contained in the manganese sand are reduced to low-valence manganese ions, and phosphorus and manganese on the surface of the manganese sand form manganese-phosphorus precipitation to achieve the efficient removal of phosphorus from the sewage.

(2) The straight-line sewage treatment system provided in the present invention requires low infrastructure operation costs and is simple to operate and manage. Compared with conventional liquid carbon sources commonly used in urban sewage treatment processes, polycaprolactone added in the system as an additional carbon source and biofilm carrier reduces the costs. The design of the rotary sealing cover of the enhanced denitrification tank facilitates the regular replacement of polycaprolactone, thereby simplifying the operation and achieving enhanced and more efficient sewage treatment.

(3) The disinfection tank in the present invention uses peroxyacetic acid for disinfection. The disinfection tank is equipped with the stirrer to achieve uniform mixing of the disinfectant. The use of peroxyacetic acid as the disinfectant is simple to operate and efficient in disinfection. The products from the decomposition of peroxyacetic acid after disinfection have no harm to people or the environment.

(4) In the straight-line sewage treatment system for enhanced treatment of low C/N domestic sewage of the present invention, two functional bodies are constructed, i.e., deep nitrogen removal by denitrification is achieved in the enhanced denitrification tank, and organics degradation, nitrification and chemical phosphorus removal are carried out in the enhanced phosphorus removal tank, to achieve enhanced and more efficient treatment of the domestic sewage. In the present invention, the high molecular polymer introduced into the enhanced denitrification tank as an additional carbon source for denitrification has the characteristic of long-term sustained release of carbon, and therefore reduces treatment costs. Because the sewage flows by itself from the enhanced denitrification tank into the enhanced phosphorus removal tank, the energy consumption of sewage treatment is reduced, which is economical and environmentally friendly and meets the goal of energy conservation and carbon reduction.

DETAILED DESCRIPTION

The present invention is described in further detail below in conjunction with the accompanying drawings and embodiments, but the scope of protection of the present invention is not limited thereto.

Embodiment 1

Figure 1:
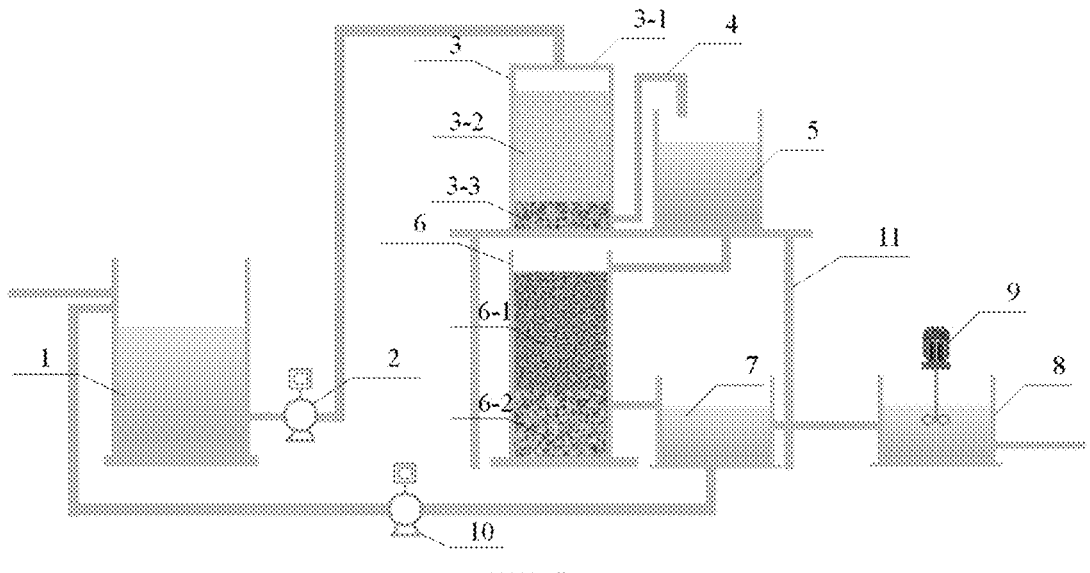
FIG. 1 is a schematic diagram of a straight-line sewage treatment system for enhanced treatment of low C/N domestic sewage according to Embodiment 1 of the present invention. List of reference numerals: 1. sewage intake tank; 2. lifting pump; 3. enhanced denitrification tank; 3-1. rotary sealing cover; 3-2. high molecular polymer introduction layer; 3-3. first water collecting layer; 4. effluent pipe; 5. first storage tank; 6. enhanced phosphorus removal tank; 6-1. filler layer; 6-2. second water collecting layer; 7. second storage tank; 8. disinfection tank; 9. stirrer; 10. reflux pump; 11. support.

As shown in FIG. 1, this embodiment provides a straight-line sewage treatment system for enhanced treatment of low C/N domestic sewage, including a sewage intake tank 1. The sewage intake tank 1 is in communication with an enhanced denitrification tank 3 through a pipeline. An effluent outlet of the enhanced denitrification tank 3 is in communication with an effluent pipe 4. A first storage tank 5 is arranged below the effluent pipe 4. The effluent from the enhanced denitrification tank 3 flows into the first storage tank 5 through the effluent pipe 4. The first storage tank 5 is in communication with an enhanced phosphorus removal tank 6 through a pipeline. The enhanced phosphorus removal tank 6 is in communication with a second storage tank 7 through a pipeline. The second storage tank 7 is in communication with a disinfection tank 8 and the sewage intake tank 1 through pipelines respectively.

A lifting pump 2 is arranged on the pipeline through which the sewage intake tank 1 is in communication with the enhanced denitrification tank 3.

The straight-line sewage treatment system further includes a support 11, the enhanced denitrification tank 3 is arranged on the support 11, and the enhanced phosphorus removal tank 6 is arranged below the support 11.

A rotary sealing cover 3-1 is arranged at the top of the enhanced denitrification tank 3. A high molecular polymer introduction layer 3-2 and a first water collecting layer 3-3 are arranged in sequence from top to bottom in the enhanced denitrification tank 3. The high molecular polymer introduction layer 3-2 is filled with a high molecular polycaprolactone polymer.

A filler layer 6-1 and a second water collecting layer 6-2 are arranged in sequence from top to bottom in the enhanced phosphorus removal tank 6, and the first water collecting layer 3-3 and the second water collecting layer 6-2 are filled with gravels.

The filler layer 6-1 is filled with a mixture of natural river sand having a particle size of 1-1.5 mm, biological ceramic grains having a particle size of 2-3 mm, and manganese sand having a particle size of 1-2 at a ratio of 7:2:1.

The second storage tank 7 is provided with an effluent outlet in communication with the sewage intake tank 1 through a pipeline and a discharge outlet in communication with the disinfection tank 8 through a pipeline.

A reflux pump 10 is arranged on the pipeline through which the second storage tank 7 is in communication with the sewage intake tank 1.

A stirrer 9 is arranged in the disinfection tank 8.

The sewage intake tank 1 is the front part of the system, in which uniform mixing of influent sewage and reflux sewage is achieved.

The rotary sealing cover 3-1 is arranged at the top of the enhanced denitrification tank 3. The high molecular polymer introduction layer 3-2 and the first water collecting layer 3-3 are arranged in the enhanced denitrification tank 3. The rotary sealing cover 3-1 allows for the regular replacement of the high molecular polymer. The high molecular polymer introduction layer 3-2 is filled with polycaprolactone, which on the one hand, provides a sufficient carbon source for the denitrification process in the enhanced denitrification tank 3, and on the other hand, serves as a biofilm carrier for the attachment of microorganisms. The effluent pipe 4 based on the theory of communicating vessels is arranged at the bottom of the enhanced denitrification tank 3 to create an anaerobic environment for enhanced denitrification and extend the time of interaction between sewage and microorganisms.

The filler layer 6-1 and the second water collecting layer 6-2 arranged in the enhanced phosphorus removal tank 6 are functional tanks for providing a nitrification effect and an enhanced phosphorus removal effect. The filler layer 6-1 is filled with a mixture of natural river sand having a particle size of 1-1.5 mm, biological ceramic grains having a particle size of 2-3 mm, and manganese sand having a particle size of 1-2. The natural river sand has good permeability, t. The biological ceramic grains have the characteristics of large specific surface area, well-developed micro pores, strong adsorption capacity, and being favorable for biofilm formation, and therefore are favorable for growth of microorganisms. The main component of the manganese sand is manganese dioxide, which has a chemical phosphorus removal effect. The natural river sand, the biological ceramic grains, and the manganese sand are at a ratio of 7:2:1.

Operation process of the present invention: Sewage in the sewage intake tank 1 is lifted by the lifting pump 2 to flow into the enhanced denitrification tank 3 through the pipeline, and then sequentially flows through the high molecular polymer introduction layer 3-2, the first water collecting layer 3-3, and the effluent pipe 4 which is based on the theory of communicating vessels. The nitrate nitrogen in the sewage is removed by denitrification under the action of the denitrification bacteria in the enhanced denitrification tank 3, using the carbon source slowly released from polycaprolactone as an electron donor. The design of the effluent pipe 4, on the one hand, creates an anaerobic environment for enhanced denitrification in the enhanced denitrification tank 3, and on the other hand, extends the time of interaction between sewage and microorganisms, providing a more complete denitrification effect in the system. The effluent from the enhanced denitrification tank 3 flows into the first storage tank 5, and flows by itself into the enhanced phosphorus removal tank 6. The biological ceramic grains in the filler layer 6-1 have good ammonia nitrogen adsorption performance and provide a suitable place for growth of microorganisms, which promotes the transformation of ammonia nitrogen into nitrate nitrogen under the action of nitrification bacteria. At the same time, the organic matters can be removed by filtering, retention and adsorption and microbial degradation in this region. Based on the co-degradation effect of manganese sand and microorganisms on organic matters, high-valence manganese ions contained in the manganese sand are reduced to low-valence manganese ions, and phosphorus and manganese on the surface of the manganese sand form manganese-phosphorus precipitation to achieve the removal of phosphorus from the sewage. The effluent from the enhanced phosphorus removal tank 6 flows into the second storage tank 7. A part of the sewage in the second storage tank 7 flows back to the sewage intake tank 1 through a reflux pipe equipped with the reflux pump 10. The remaining part of the sewage in the second storage tank 7 flows into the disinfection tank 8 for disinfection with peroxyacetic acid, and then can be directly discharged.

Embodiment 2

Sewage treatment was carried out using the straight-line sewage treatment system for enhanced treatment of low C/N domestic sewage in Embodiment 1. Natural biofilm formation was adopted in the start-up and biofilm formation phase. When the chemical oxygen demand (COD) and the removal rate of ammonia nitrogen in the system tend to be stable, the start-up and biofilm formation in the system is deemed as successful. In this embodiment, the start-up and biofilm formation in the system succeeded after 55 d. Water formulated by dissolving glucose, ammonium chloride, potassium dihydrogen phosphate, and sodium dodecyl benzene sulfonate (SDBS) was used as influent sewage to simulate rural sewage. The water quality indicators of the influent sewage were as follows: COD: 101-180 mg/L; ammonia nitrogen: 29.6-46.9 mg/L; TN: 30.5-49.5 mg/L; TP (total phosphorus): 3.3-6.6 mg/L; SDBS: 6.3-16.2 mg/L. Times switches were used in the system to control the running time of the lifting pump, the reflux pump and the stirrer. The hydraulic load of the system was 1-1.5 $m^3/(m^2*d)$. The influent sewage was fed four times per day. For feeding of the influent sewage, the lifting pump was turned on, and the feeding time was 1 h. 2 h after the lifting pump has been turned off, the effluent outlet of the second storage tank connected to the disinfection tank was opened, and the sewage flowed into the disinfection tank, treated with per-oxyacetic acid for 30 min, and then discharged. 3 h after the lifting pump has been turned off, the effluent outlet of the second storage tank connected to the disinfection tank was closed, the reflux pump was turned on, and the ratio of the volume of return sewage in the second storage tank to the influent sewage was 4:1. The reflux pump was turned off after refluxing for 40 min. 80 min after the reflux pump has been turned off, the lifting pump was turned on again. Thus, one cycle of operation was complete. After the process was stable, the water quality of the final effluent from the system was measured and microbial samples on the surface of the filler medium were obtained for microbial community composition analysis. The test results are shown in FIG. 2 to FIG. 6.

Figure 2:
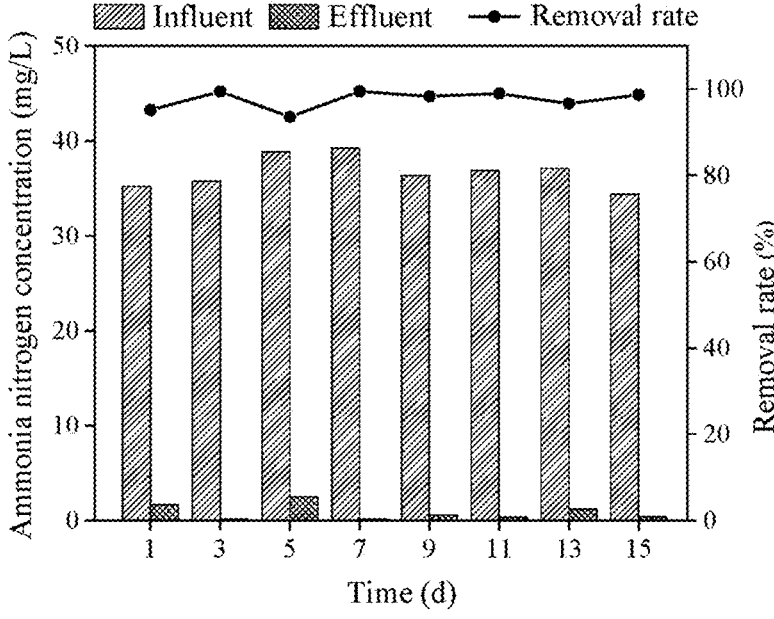
FIG. 2 is a diagram showing the effect of ammonia nitrogen removal in the effluent from a straight-line sewage treatment system for enhanced treatment of low C/N domestic sewage according to Embodiment 2 of the present invention.

It can be seen from FIG. 2 that in this embodiment, the straight-line sewage treatment system for enhanced treatment of low C/N domestic sewage achieved a removal rate of ammonia nitrogen of 97% or more and the effluent ammonia nitrogen concentration was 0.91 mg/L, which are superior to the criteria of Class III in the Environmental Quality Standard for Surface Water (GB 3838-2002) and the criteria of Grade 1-A in the Discharge Standard of Pollutants for Municipal Wastewater Treatment Plant (GB 18918-2002).

Figure 3:
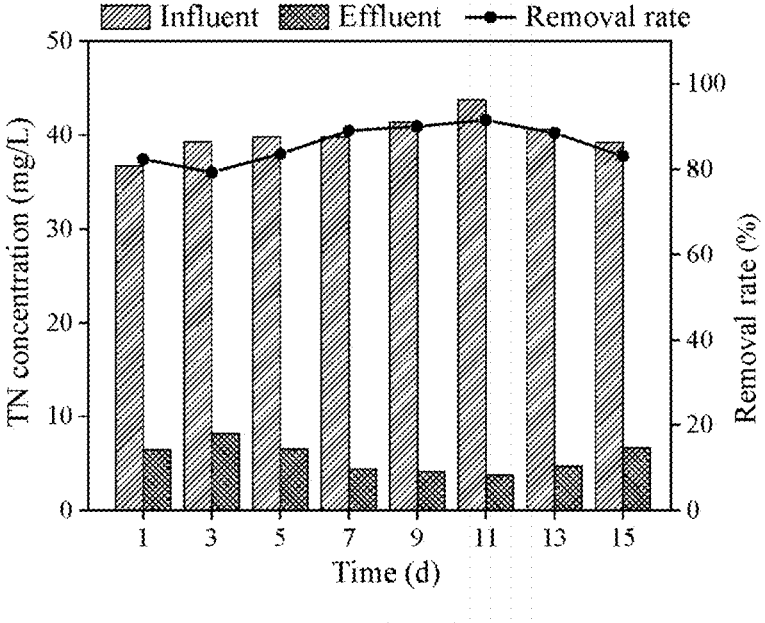
FIG. 3 is a diagram showing the effect of TN removal in the effluent from the straight-line sewage treatment system for enhanced treatment of low C/N domestic sewage according to Embodiment 2 of the present invention.

It can be seen from FIG. 3 that in this embodiment, the straight-line sewage treatment system for enhanced treatment of low C/N domestic sewage exhibited an excellent TN removal effect, and the TN concentration in the final effluent from the system was 5.59 mg/L, which was far lower than that specified in the criteria of Grade 1-A in the Discharge Standard of Pollutants for Municipal Wastewater Treatment Plant (GB 18918-2002).

Figure 4:
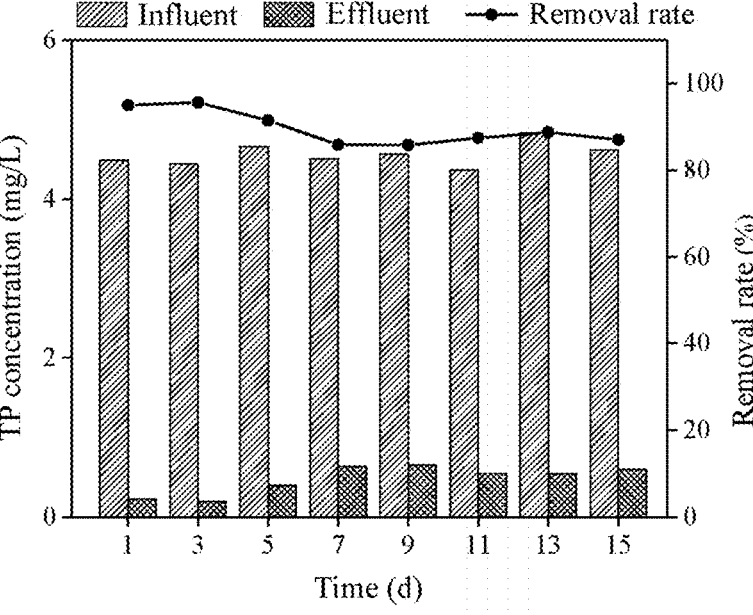
FIG. 4 is a diagram showing the effect of TP removal in the effluent from the straight-line sewage treatment system for enhanced treatment of low C/N domestic sewage according to Embodiment 2 of the present invention.

It can be seen from FIG. 4 that in this embodiment, the straight-line sewage treatment system for enhanced treatment of low C/N domestic sewage exhibited an excellent phosphorus removal effect, the manganese sand filler in the enhanced phosphorus removal tank provided a stable phosphorus removal effect to further reduce the total phosphorus concentration in the effluent from the system, and the average effluent total phosphorus concentration was 0.47 mg/L, which was lower than that specified in the criteria of Grade 1-A in the Discharge Standard of Pollutants for Municipal Wastewater Treatment Plant (GB 18918-2002).

Figure 5:
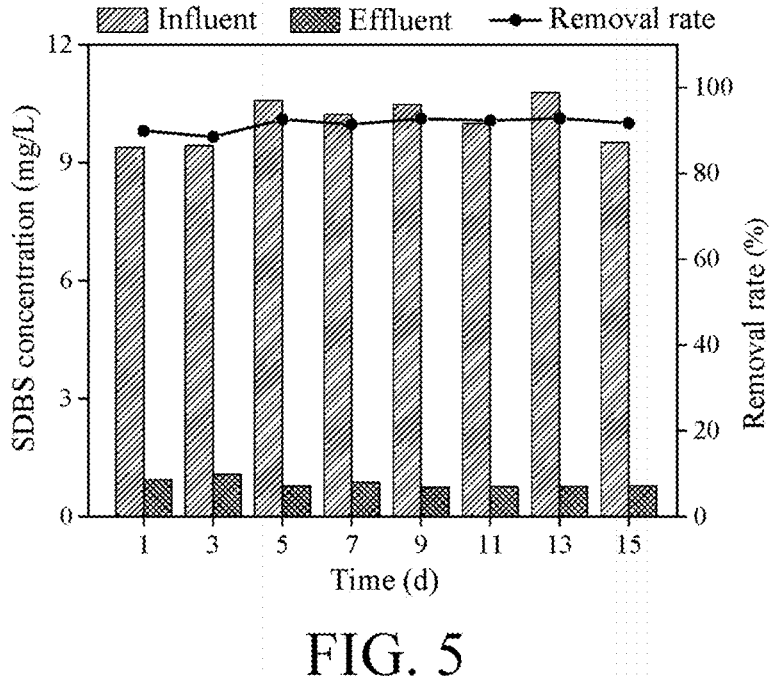
FIG. 5 is a diagram showing the effect of removal of sodium dodecyl benzene sulfonate as the anionic surfactant in the effluent from the straight-line sewage treatment system for enhanced treatment of low C/N domestic sewage according to Embodiment 2 of the present invention.

It can be seen from FIG. 5 that in this embodiment, the straight-line sewage treatment system for enhanced treatment of low C/N domestic sewage exhibited an excellent effect of removing the anionic surfactant SDBS, and the concentration of the anionic surfactant SDBS in the final effluent from the system was 0.85 mg/L, which is lower than that specified in the Standards for Irrigation Water Quality (GB 5084-2021).

Figure 6:
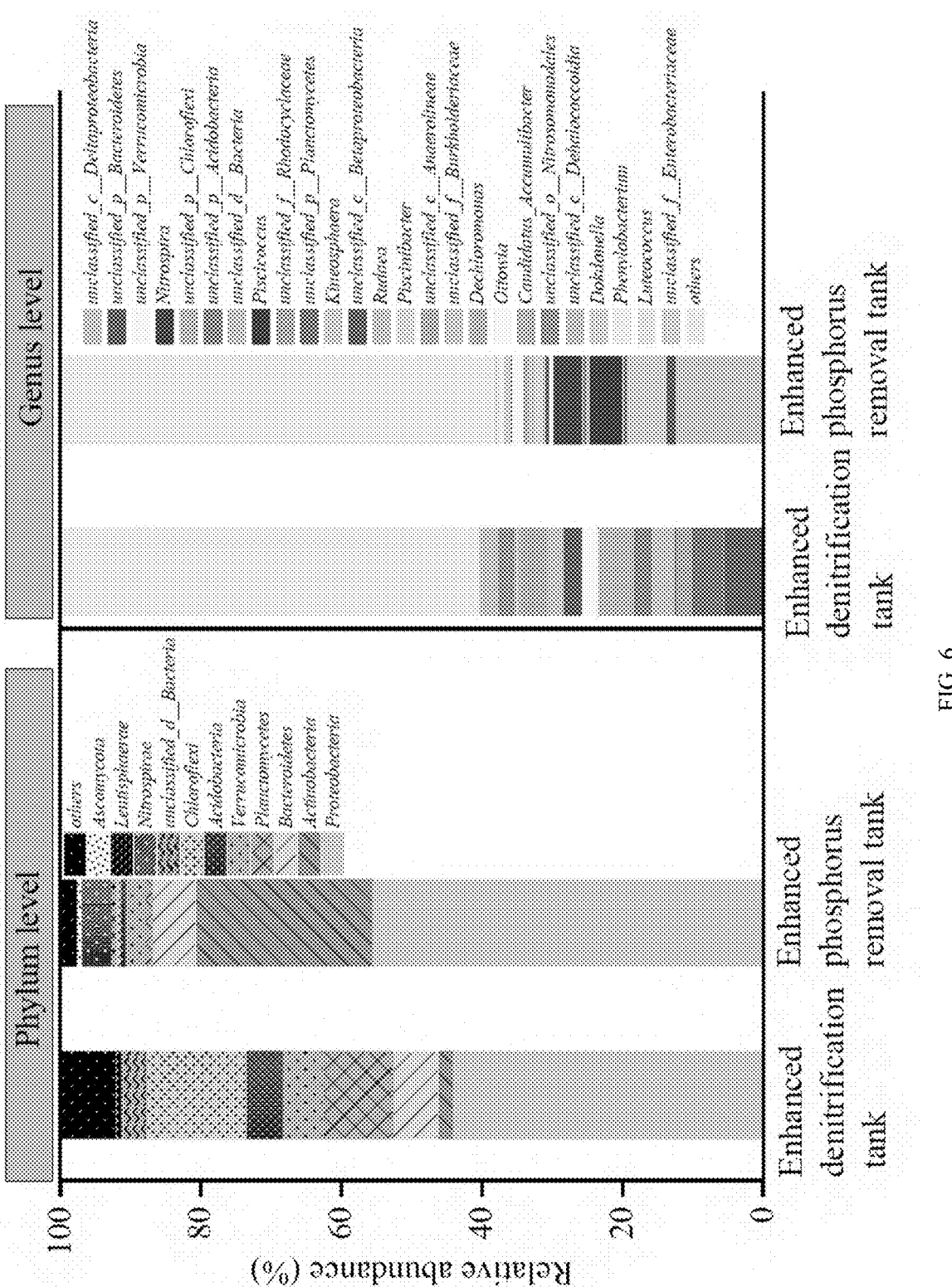
FIG. 6 is a diagram showing the microbial community composition in the straight-line sewage treatment system for enhanced treatment of low C/N domestic sewage according to Embodiment 2 of the present invention.

It can be seen from FIG. 6 that in this embodiment, the microbial community composition in the enhanced denitrification tank was significantly different from that in the enhanced phosphorus removal tank. The phylum-level microbial community composition showed that: Actinobacteria related to ammonia nitrogen removal was enriched in the enhanced phosphorus removal tank, and the relative abundance of Actinobacteria was 25.1% in the enhanced phosphorus removal tank and 2.1% in the enhanced denitrification tank, indicating that the removal of ammonia nitrogen by the system mainly occurred in the enhanced phosphorus removal tank; Nitrospirae for nitrification was only present in the enhanced phosphorus removal tank; Planctomycetes played an important role in the removal of TN, and was enriched in the enhanced denitrification tank. The genus-level microbial community composition showed that denitrification bacteria such as Rhodocyclaceae and Dechloromonas were enriched effectively in the enhanced denitrification tank, indicating that the enhanced denitrification tank provided an efficient denitrification effect.

Comparative Example 1

Comparative Example 1 differs from Embodiment 1 in that: the rotary sealing cover 3-1 was arranged at the top of the enhanced denitrification tank 3, the first water collecting layer 3-3 was arranged in the enhanced denitrification tank 3, and the high molecular polymer introduction layer 3-2 was not arranged.

Comparative Example 2

Comparative Example 2 differs from Embodiment 1 in that: the filler layer 6-1 was filled with a mixture of natural river sand having a particle size of 1-1.5 mm and biological ceramic grains having a particle size of 2-3 mm and the natural river sand and the biological ceramic grains were at a ratio of 7:3.

Comparative Example 3

Comparative Example 3 differs from Embodiment 1 in that: the filler layer 6-1 was filled with a mixture of natural river sand having a particle size of 1-1.5 mm and manganese sand having a particle size of 1-2 mm, and the natural river sand and the manganese sand were at a ratio of 9:1.

Sewage treatment was carried out using the straight-line sewage treatment systems for enhanced treatment of low C/N domestic sewage in Comparative Examples 1 to 3. Settings of the sewage treatment processes were the same as those in Embodiment 2. The sewage treatment effects are shown in Table 1.

TABLE 1

| | Removal rate of ammonia nitrogen (%) | TN removal effect (mg/L) | Total phosphorus concentration (mg/L) | Removal of anionic surfactant SDBS (mg/L) |
|---|---|---|---|---|
| Comparative Example 1 | 76% | 10.91 | 0.54 | 1.15 |
| Comparative Example 2 | 95% | 5.98 | 2.40 | 0.79 |
| Comparative Example 3 | 81% | 8.72 | 0.75 | 1.62 |

It can be seen from Table 1 that in Comparative Example 1, the high molecular polymer introduction layer was not arranged, resulting in a poor removal effect of nitrate nitrogen; in Comparative Example 2, the filler layer was filled with a mixture of natural river sand and biological ceramic grains and did not include manganese sand, exhibiting a poor phosphorus removal effect, with the average effluent total phosphorus concentration being 2.40 mg/L; and in Comparative Example 3, the filler layer was filled with a mixture of natural river sand and manganese sand and did not include biological ceramic grains, resulting in reduced ammonia nitrogen adsorption performance, a poor removal rate of ammonia nitrogen and a poor TN removal effect, and exhibiting a poor anionic surfactant SDBS removal effect.

Although the main features and basic principles of the present invention have been set forth in the above embodiments, the present invention is not limited to these embodiments. It may be appreciated by those of ordinary skill in the art that modifications or equivalent replacements may be made to the technical solutions of the present invention without departing from the scope of the technical solutions of the present invention.

What is claimed is:

1. A straight-line sewage treatment system for enhanced treatment of domestic sewage, comprising a sewage intake tank (1), wherein the sewage intake tank (1) is in communication with an enhanced denitrification tank (3) through a pipeline, an effluent outlet of the enhanced denitrification tank (3) is in communication with an effluent pipe (4), a first storage tank (5) is arranged below the effluent pipe (4), the effluent from the enhanced denitrification tank (3) flows into the first storage tank (5) through the effluent pipe (4), the first storage tank (5) is in communication with an enhanced phosphorus removal tank (6) through a pipeline, the enhanced phosphorus removal tank (6) is in communication with a second storage tank (7) through a pipeline, and the second storage tank (7) is in communication with a disinfection tank (8) and the sewage intake tank (1) through pipelines respectively; wherein a rotary sealing cover (3-1) is arranged at the top of the enhanced denitrification tank (3), a molecular polymer introduction layer (3-2) and a first water collecting layer (3-3) are arranged in sequence from top to bottom in the enhanced denitrification tank (3), and the molecular polymer introduction layer (3-2) is filled with a molecular polycaprolactone polymer.

2. The straight-line sewage treatment system for enhanced treatment of domestic sewage according to claim 1, wherein a lifting pump (2) is arranged on the pipeline through which the sewage intake tank (1) is in communication with the enhanced denitrification tank (3).

3. The straight-line sewage treatment system for enhanced treatment of domestic sewage according to claim 1, wherein the straight-line sewage treatment system further comprises a support (11), the enhanced denitrification tank (3) is arranged on the support (11), and the enhanced phosphorus removal tank (6) is arranged below the support (11).

4. The straight-line sewage treatment system for enhanced treatment of domestic sewage according to claim 1, wherein a filler layer (6-1) and a second water collecting layer (6-2) are arranged in sequence from top to bottom in the enhanced phosphorus removal tank (6), and the first water collecting layer (3-3) and the second water collecting layer (6-2) are filled with gravels.

5. The straight-line sewage treatment system for enhanced treatment of domestic sewage according to claim 1, wherein the filler layer (6-1) is filled with a mixture of natural river sand having a particle size of 1-1.5 mm, biological ceramic grains having a particle size of 2-3 mm, and manganese sand having a particle size of 1-2 at a ratio of 7:2:1.

6. The straight-line sewage treatment system for enhanced treatment of domestic sewage according to claim 1, wherein the second storage tank (7) is provided with an effluent outlet in communication with the sewage intake tank (1) through a pipeline and a discharge outlet in communication with the disinfection tank (8) through a pipeline.

7. The straight-line sewage treatment system for enhanced treatment of domestic sewage according to claim 1, wherein a reflux pump (10) is arranged on the pipeline through which the second storage tank (7) is in communication with the sewage intake tank (1).

8. The straight-line sewage treatment system for enhanced treatment of domestic sewage according to claim 1, wherein a stirrer (9) is arranged in the disinfection tank (8).

* * * * *